United States Patent
Worrell

[11] 3,852,754
[45] Dec. 3, 1974

[54] BINARY BEAM SYSTEM
[75] Inventor: Edsel A. Worrell, Bethesda, Md.
[73] Assignee: Litton Systems, Inc., College Park, Md.
[22] Filed: Sept. 21, 1971
[21] Appl. No.: 182,461

[52] U.S. Cl. .......................... 343/113 R, 343/100 R
[51] Int. Cl. ............................................... G01s 5/02
[58] Field of Search ................................. 343/113 R

[56] References Cited
UNITED STATES PATENTS

| | | | |
|---|---|---|---|
| 3,125,756 | 3/1964 | Kaufman et al. | 343/113 R |
| 3,213,453 | 10/1965 | Morrison et al. | 343/113 R |
| 3,249,943 | 5/1966 | Kaufman | 343/113 R |
| 3,406,397 | 10/1968 | Easton et al. | 343/113 R |

Primary Examiner—Maynard R. Wilbur
Assistant Examiner—T. M. Blum
Attorney, Agent, or Firm—Alfred B. Levine; Alan C. Rose

[57] ABSTRACT

A digital direction finder system for radio waves in which the individual bits of the code indicating direction are obtained by comparing and successively partially resolving errors in the digitized phase angle displacement indicated by plural pairs of antennas having progressively different spacing between the respective pairs. The spacing between the closest pair of antennas is more than one-half of the wavelength so that larger and higher gain antennas may be employed. The system may be operated over a wide range of frequencies where the highest frequency may be many times greater than the lowest frequency.

11 Claims, 11 Drawing Figures 3,852,754

BINARY BEAM SYSTEM

BACKGROUND AND STATEMENT OF THE INVENTION

Interferometers for determining the spatial direction of incoming radio waves referenced to an array of spaced antennas are known wherein the direction of the wave is determined by measuring the phase differences of signals received by the antennas. Where a pair of the antennas are spaced apart by only one half the wavelength or less at the frequency involved, the measured phase difference of the received signal is never greater than 360° and the direction of the incoming wave can be coarsely determined in an unambiguous fashion. However when the antenna pairs are more widely spaced apart such as at once, twice, three times, or even greater multiples of the wavelength, than the measured phase delay of the received signal corresponding varies over multiples of the 360° and therefore creates many ambiguities as to the spatial angle.

Where the interferometer is to be employed over a wide range of different frequencies, such as over a percentage band-width of six to one, than the spacing between antenna elements at the lowest frequency (longest wavelength) may be only one-half wavelength, yet the same physical spacing at the highest frequency is a multiple of three times the higher wavelength. Consequently as the frequency range, or percentage bandwidth, of the system is increased, practical considerations dictate that such a system be capable of determining the direction without ambiguity despite measured phase differences occuring over multiples of 360°.

SUMMARY OF THE INVENTION AND ADVANTAGES

According to the present invention there is provided a system for digital interferometric direction finding or location of radio signals that determines the spatial direction of the wave by comparing the different time phase displacements produced by different pairs of antenna elements that are spaced at different distances apart. To obtain the advantages of higher gain and efficiency as well as lower costs, the minimum spacing between any pair is more than one-half of the wavelength at the maximum frequency involved.

Such wide apart spacing of the antenna elements permits the use of higher gain and higher efficiency antennas, even at the higher microwave bandwidths. However, correspondingly, the wide spacing provides numerous ambiguities, or like signals being produced by each pair of antennas for different spatial angle of the incoming wave.

Due to the different spacing between each pair of antennas over the others, an incoming wave produces a different phase shift in each pair of antennas, and the ambiguities produced by each pair accordingly occur at different spatial angles of the incoming wave. This characteristic of the system is employed to enable the successive resolution of the ambiguities and the obtaining of the desired directional information with the desired degree of resolution.

To provide a digitally operating system, the time phase displaced signals obtained from the pairs of differently spaced antennas are quantized and the quantized phase signals are combined with each other to define the spatial direction of the incoming wave in a fully unambiguous digital code as desired.

RELATED APPLICATIONS OF THE SAME ASSIGNEE

In an earlier application of the same Assignee Ser. No. 501,231 now U.S. Pat. No. 3,631,496 of Charles Fink et al, there is provided an interferometric direction finding system employing different digital means, including amplitude comparison, to determine the spatial angle of an incoming wave.

A further application of the same inventors now U.S. Pat. No. 3,617,900 employs different digital comparison means for determining the frequency of such an incoming wave.

DETAILED DESCRIPTION OF A PREFERRED EMBODIMENT

Figure 1:
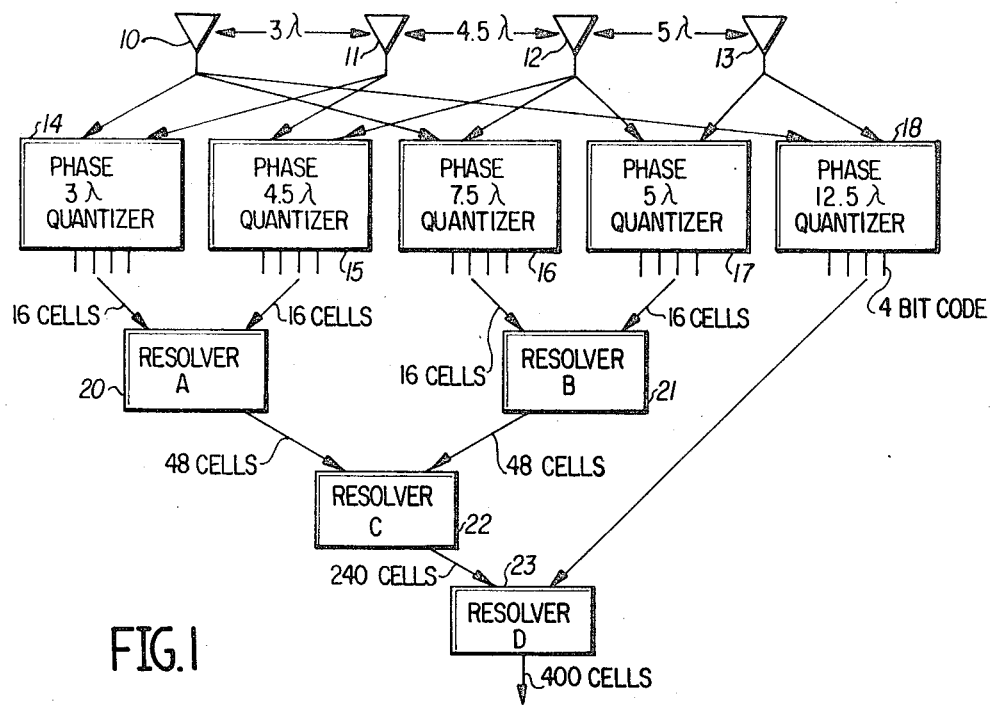
FIG. 1 is an electrical schematic block diagram illustrating one preferred embodiment of the invention.

Referring to FIG. 1, there is shown a preferred digital system for determining the spatial direction of an incoming wave in azimuth within an accuracy of less than 0.1° RMS on boresight at the maximum frequency; and operation over more than a 6 to 1 frequency band.

As shown, the system includes an array of antenna elements 10, 11, 12, and 13, that are employed in five pairs, and with each pair being spaced a different distance apart. A first pair of antenna elements 10 and 11 are spaced apart by three wave lengths at the frequency involved; elements 11 and 12 forming the next pair are spaced apart at 4½ wavelengths; elements 10 and 12, forming the next succeeding pair, are spaced at 7½ wavelengths apart; elements 12 and 13 are spaced at 5 wavelengths apart; and finally elements 10 and 13 forming the remaining pair are spaced at 12½ wavelengths apart. It will be appreciated that a total of 10 descrete antenna elements may be employed to provide the five pairs of antennas desired, instead of using different combinations of the four antenna elements as shown. It will also be understood that other arrangements using different numbers of antennas may be employed.

The time phase relationship of received signals is determined from each antenna pair by employing a phase comparator and quantizer for each pair of antennas. Thus the phase difference between the antenna elements 10 and 11, spaced apart by three wavelengths, is determined by phase comparator and quantizer 14, and this unit 14 produces a four digit output code proportional to the phase difference. Similarly the phase difference between antenna elements 11 and 12 is compared and quantized by comparator 15; that between antennas 10 and 12 by comparator 16; that between antennas 12 and 13 by comparator 17; and finally that between antennas 10 and 13 by comparator 18.

In this manner there is derived five different digital codes, with each code representing the different time phase produced by a pair of differently spaced antennas in response to an incoming wave directed at an space angle to the linear array of these antennas.

Figure 2:
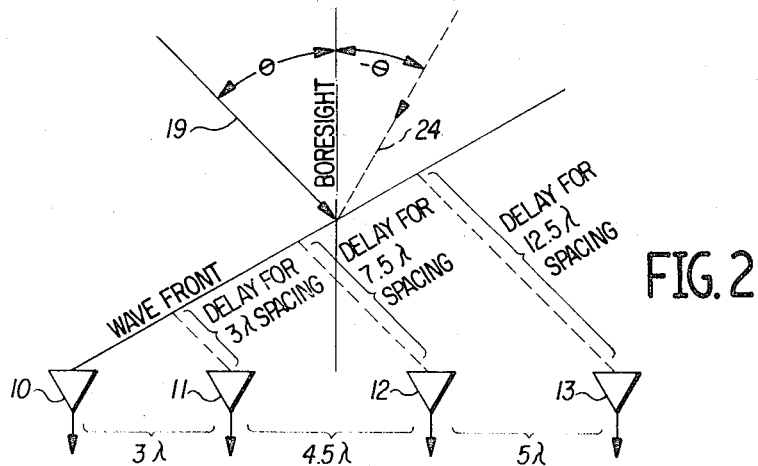
FIG. 2 is a diagrammatic view illustrating the spatial relationship of an incoming wave referenced to the array of antennas.

The reason for each of the phase signals being different and also changing at a different rate from the others is best illustrated in FIG. 2 showing the spatial relationship of an incoming radio wave 19 received by the four spaced apart antenna elements. As shown where the incoming wave 19 is received at a spatial angle θ, referenced to the boresight of the antenna array, the wavefront is first received by antenna 10, and after a given time phase delay by antenna 11, then later by antenna 12, and finally by antenna 13. Thus for each different space direction of the incoming wave, all four time phase delay signals are different. For any given spatial angle it can be shown that the time phase delay $\phi$ between any pair of antennas is directly proportional to the spacing or distance between that pair of antennas, (measured in wavelengths at the frequency involved). It is also known that the time phase delay is proportional to the sine of the spatial angle referenced to boresight.

Stated mathematically:

$$\phi = 360° \times D\tau \times \sin \theta$$

where
  $\phi$ is the time phase delay
  D is the distance between antennas in wavelengths
  $\tau$ is the wavelength at the frequency, and
  $\theta$ is the spatial angle of the incoming wave.

Thus for antenna elements 10 and 11 that are spaced apart by three wavelengths, the time phase difference (or delay) is:

$$\phi = 360° \times 3 \times \sin \theta$$

From this formula it is seen that as the space angle of the incoming wave varies from 0° to 90°, the phase difference between antenna elements 10 and 11 passes through three repetitive cycles of 360° time phase delay; the phase angle between antenna elements 11 and 12 goes through four and a half repetitive cycles of 360° delay, that between antennas 10 and 12 passes through seven and a half complete 360° phase delays; that between antennas 12 and 13 passes through five complete 360° phase cycles, and finally that between antennas 10 and 13 passes through twelve and a half complete 360° time phase cycles.

Returning to FIG. 1, it is therefore seen that each of the phase comparator quantizers 14, 15, 16, 17, and 18 produces a different phase angle code than the others for each different direction or spatial angle of the received input radio wave 19, and that each of these codes being produced repeats itself a number of times as the direction of the incoming wave changes, in proportion to the spacing between that pair of antennas.

According to the present invention it is preferred that the minimum spacing between the closest pair of antennas 10 and 11 be a more than one half of the wavelength and preferably be several wavelengths apart (i.e., 1, 1.5, 2.3, 3). This wide apart spacing is desired so that physically larger antenna elements can be employed having greater gain and higher efficiencies. It will be appreciated that as the system is employed at higher and higher microwave frequencies, the physical dimensions of a one wavelength spacing become smaller and smaller. Thus to provide a fixed physical spacing between the closest pair of antenna elements, requires that the spacing expressed in wavelengths increases in direct proportion to the frequency.

The functioning of the remainder of the system of the present invention is to digitally process the five different digital phase codes being produced so as to accurately define the spatial direction of the incoming wave in an unambiguous fashion and with the desired degree of precision, e.g. within an angular direction of a tenth degree or less.

To successively determine the direction of the wave and resolve ambiguities, the different digital codes from the comparator-quantizer 14 and from the comparator-quantizer 15 are applied to a digital resolver 20 which performs the function of eliminating certain ones of the ambiguities and producing a modified digital code defining the direction within the resolution of the 4½ wavelength antenna pair 11 and 12, yet with fewer ambiguities.

Similarly, the digital codes from quantizers 16 and 17 are applied to a digital resolver 21 serving a similar function of reducing the ambiguities inherent in the seven and one half wavelength spaced antennas yet maintaining the resolution of this pair. This additional resolver 21 produces a modification in the code produced by quantizer 16.

In the next succeeding level of the preferred system, the modified codes from resolvers 20 and 21 are still further resolved by application to an additional resolver 22, and in this resolution all of the remaining ambiguities are eliminated and the incoming wave is defined in its spatial direction with the accuracy or resolution provided by the seven and one half wavelength spacing of antennas 10 and 12. In short, the spatial angle of the wave over a +90 field of view is defined within an angular direction of 0.14 degrees RMS on the antenna boresight.

For improving the accuracy even further to spatially define the incoming wave within a 0.08° direction in space, a still additional resolver 23 is preferably employed. Resolver 23 is energized by the digital code signal from quantizer 18 and from the signal obtained from higher level resolver 22 to provide a still further modification of the resulting code, defining the wave within the inherent accuracy of the twelve and one half wavelengths antennas 10 and 13 or to within a spatial sector direction of less than 0.1° RMS on boresight.

For an understanding of the manner of resolving the ambiguities and improving accuracy by successive digital resolution, reference is made to FIG. 3 illustrating the variation of the phase output of the phase comparators 14, 15, 16, 17, and 18 as the space angle θ of the incoming radio wave 19 changes from boresight (see FIG. 2) over the range of 0° to 90°. To provide a simplified illustration using straight line variations, the phase outputs of the quantizers are plotted against the sine of the space $\theta$ rather than against the space angle $\theta$ itself.

As shown in the upper plot, of FIG. 3a, (solid line plot) as the space angle varies from sine 0° to sine 90°, or from 0 to 1, the magnitude of phase difference output from the 4½ wavelength spaced apart antennas 12 and 11 (quantizer 15), varies from 0° to 360° in a repetitive manner, repeating itself four and one times as follows:

$$\phi = 360° \times 4\tfrac{1}{2} \times \sin\theta$$

Since for practical measurement purposes, a system cannot distinquish between an output time phase angle of 10° and one of 370° the output of quantizer 15 repeats itself or produces a total of 4½ ambiguities in each 90° variation of the space angle $\theta$. In other words, the 4½ wavelength quantizer 15 produces the same phase difference output code in each of 4½ different space sectors or quadrants. For example, as shown in FIG. 3a, the same 360° time phase angle $\phi$ is produced by quantizer 15 at those four different space angles ($\phi$) where sine $\theta = 4/9$, and sin $\theta = 2/3$ and sin $\theta = 2/9$, and sin $\theta = 8/9$. In a similar manner, the 3 wavelengths spaced quantizer 14 (dotted line plot) repeats its code three times as the space angle $\theta$ is varied from 0° to 90°, and thus produces three ambiguities or provides three different space quadrants where the phase angle varies from 0° to 360°.

However by resolving the codes of quantizers 14 and 15 against each other, there is provided a pair of digital codes defining each space angle that changes at a different rate than either code, thereby enabling the generating or derivation of a new digital code having fewer ambiguities. Returning to FIG. 3a, it is seen that at the discussed angle where sin $\theta$ equals 2/9, quantizer 15 produces a phase output representing of 360° whereas the quantizer 14 produces a phase output of about 240°. In the different space quadrant where sin $\theta$ equals 4/9, the quantizer 15 again produces a phase output of 360° thereby producing an ambiguity. However at this same latter space angle, the quantizer 14 (three wavelength spaced antennas) produces a different output of about 120°. Therefore employing the outputs of both in a resolver, there is no longer an ambiguity between these two space quadrants since by using the two outputs one can distinguish between an incoming wave at the space angle where sin $\theta = 2/9$ and the different space quadrant where the sin $\theta = 4/9$.

Figure 3A:
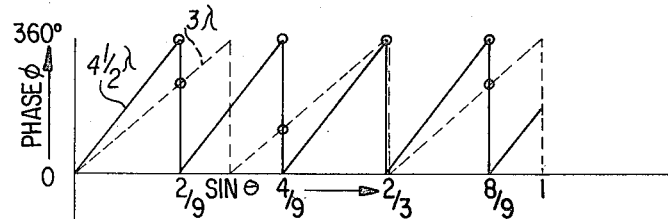
FIGS. 3a to 3c are wave form diagrams illustrating the change in phase angle between pairs of antennas plotted against change in spatial direction of the radio wave.

In a similar manner it is seen from FIG. 3a that in the different space sector where sin $\theta$ equals 2/3, the quantizer 14 again produces an ambiguous output signal representing a phase angle of 360° whereas the second quantizer 15 again corrects this ambiguity by producing an output representing an angle of 360°. Thus by resolving the output of quantizer 14 against that of quantizer 15, all ambiguities over the range of space angles from sin 0° to sin $\theta$ equals 2/3 (space angles from 0° to about 43°) are resolved. After passing this later space angle, however, both codes commence to repeat as shown in FIG. 3a, and further resolution is necessary. For example, at the space angle when sin $\theta$ equals 8/9, (about 62°) the output code of quantizer 15 represents a phase lag of 360° and that of quantizer 14 represents a lag of 240°. These are the same pair of outputs as occur at the space angle when $\theta$ equals 2/9 (at a space angle of about 13°) as illustrated in FIG. 3a.

To resolve this latter ambiguity extending from about a space angle of 43° where sin $\theta$ equals 2/3 to a space angle of 90°, the additional resolver 21 is employed to compare the quantized signals produced by quantizers 16 and 17. As previously discussed, the output of quantizer 16 repeats through a complete phase delay of 360° for seven and one half times as the incoming space angle $\theta$ of the wave changes from 0° to 90° spatial degrees since the antenna elements 10 and 12 are spaced apart by seven and one half wavelengths. In a similar manner the output of quantizer 17 repeats or cycles through a complete phase delay of 360° a total of 5 times during the same changes in the incoming space angle. These variations are plotted in FIG. 3b.

Figure 3B:
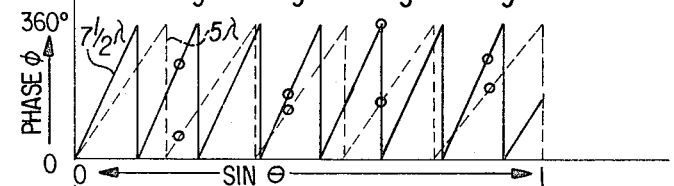

Again in resolving the output of quantizer 16 against that of quantizer 17 in digital resolver 21, there is compared an additional pair of digital codes for each spatial angle $\theta$ of the incoming wave as shown in FIG. 3b, and by still further combining or resolving this additional pair of codes with the first pair of codes in a still further resolver 22, a total of four digital codes are available and employed in the resolvers for defining each angle of the incoming wave without any ambiguities over the complete range of space angles of 0° to 90° space degrees.

Referring to FIG. 3b for a graphic illustration showing the solution of all ambiguities, it will be recalled that after the first resolution by resolver 20, the space angle is defined without ambiguity over a range of from 0° to about 43° from boresight. From about this 43° angle in space to 90° in space, the pair of outputs provided by quantizers 14 and 15 begin to repeat. However, as shown in FIG. 3b, the pair of codes produced by quantizer 16 (7½ wavelengths spaced antenna) and quantizer 17 (5 wavelength spaced antennas) cyclicly repeat their phase changes at different rates and in differing phase relationships than those of quantizers 14 and 15 (in FIG. 3a). Consequently by comparing the codes of quantizers 16 and 17 using resolver 21, and in turn, comparing or further resolving the resulting output against that obtained employing resolver 20, the spatial angle of the incoming wave can be defined by four different outputs in a completely unambigous manner.

For example, it will be recalled from FIG. 3a, that at the space angle $\theta$ where sine $\theta$ equals 2/9, the two outputs obtained from quantizers 14 and 15 are the same two as those obtained at the space angle where $\theta$ equals 8/9. However, observing FIG. 3b, it is seen that at this space angle where sine $\theta$ equals, 2/9, the quantizer 17 (five wavelengths) produces an output representing a phase of about 36° and quantizer 16 (7½) produces an output phase of about 280°. At the other space angle where the sine equals 8/9, the quantizer 17 produces a different phase output equaling about 180° and quantizer 16 also produces a different phase output equaling about 280°.

In a similar manner, it is seen by comparing the waveforms of FIGS. 3a with FIG. 3b that all of the ambiguities are resolved and that at each different space angle $\theta$ of the incoming wave, a different series of four outputs from quantizers 14, 15, 16, and 17 exist from which an unambigous digital output code can be derived from the resolvers.

Thus by processing the four quantized output phase signals from phase delay quantizers 14, 15, 16, and 17, and resolving these four outputs against each other employing resolvers 20, 21, and 22 there is obtained a modified digital output code defining the spatial direction of the incoming wave referenced to the antenna array without any ambiguity whatsoever over the entire range of 0° to 90° in space. However the accuracy or resolution of this resulting digital code is only as great as the change in phase angle experienced by the most widely spaced apart pair of antennas, which as thus far described are the antenna pair 10, 12, that are spaced apart by seven and one half wavelengths as shown in FIG. 3b. The region from −90° to 0° has not been portrayed but it also is completely unambiguous and has no point of ambiguity with the 0° to 90° region.

Assuming that each phase comparator quantizer provides a four bit binary code output to represent all angles within a complete 360+ phase variation, then it can represent changes in phase over its complete range by a total of 16 different output codes. A resolution provided by a seven and one half wavelength spacing of antennas provides a total of 16 times 7½ or 120 different code combinations to represent the variation of the space angle from 0° to 90° in space.

Figure 3C:
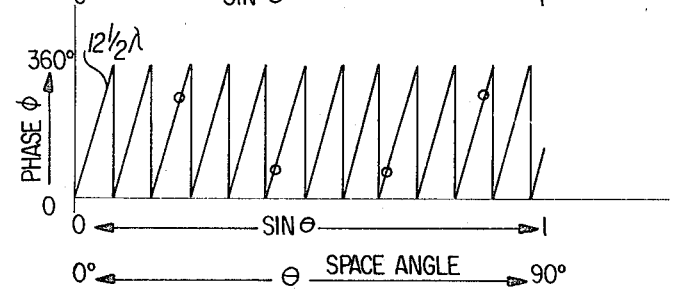

To further improve this resolution, an additional phase output code may be obtained by comparing the phase relationship between the furthest apart antennas 10 and 13, that as shown, are spaced apart by 12½ wavelengths. This additional spacing produces twelve and one half complete repeats of 360° output phase change as the space angle of wave 19 varies from 0° to 90° in space, as illustrated in FIG. 3c. Since each 360° phase change produces 16 different four bit digital codes in quantizer 18, the incoming beam 19 is now defined by a combined digital code of 16 times 12½ or by two hundred different code combinations. The quantized output code produced by quantizer 18 is finally compared with the resulting code produced by resolver 22 in the final resolver 23 to thereby improve its resolution accordingly.

It is usually desired to determine the spatial direction of the incoming radio wave over the space angle on both sides of boresight or from −0° to −90° in space as well as from 0° to 90° in space as previously discussed. The −θ° direction merely represents the fact that the incoming radio wave is arriving from the opposite side of boresight than as previously discussed, and this is generally shown in FIG. 2 by the dotted line vector numbered 24. In the case, the antenna phase relationships are reversed with the wavefront reaching antenna 13 first, then after a delay being received by antenna 12, thence by antenna 11, and finally by antenna unit 10. The output phase angle plots produce the same waveforms as are shown in FIG. 3a, FIG. 3b, and FIG. 3c but transposed on the other side of the ordinate from the 0° space angle. It is seen by comparing the waveform of FIG. 3c with those of FIGS. 3a and FIGS. 3b that since the rate of phase change with space angle becomes progressively greater in proportion to the extent of spacing between antennas, the phase change is most rapid for the antenna elements 10 and 13 that are most widely spaced apart by twelve and one half wavelengths and therefore the four bit output digital code produced by quantizer 18 changes a total of 200 times over the range space angles from 0° to 90° in space and an additional 200 times over the range of space angles from −0° to −90° in space. It therefore changes a total of 400 times over the entire range of −90° in space to +90° in space. This provides an angular resolution of 0.083° RMS on boresight.

Figure 4:
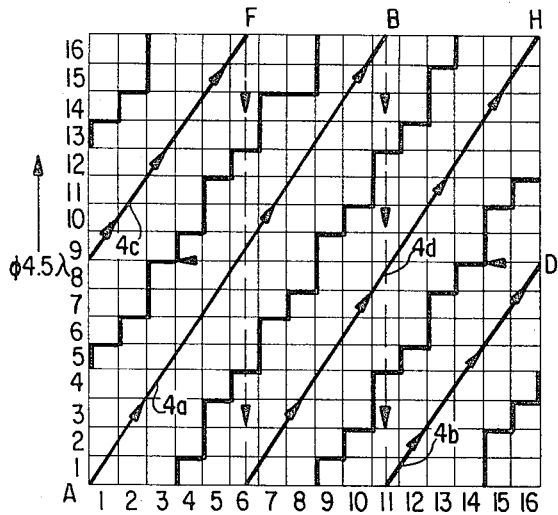
FIG. 4 is a graphic plot illustrating the change in phase of one pair of antennas referenced to the change in phase of a second pair of antennas.

In FIG. 4, the digitally represented phase output from the pair of antennas 11 and 12 (spaced apart by four and one half wavelengths) is plotted against the digital code output produced from the pair of antennas spaced apart by three wavelengths (antennas 10 and 11). These digital outputs are those obtained from comparator-quantizers 15 and 14 respectively. As previously noted each of the digital quantizers produce a four bit code and each therefore produces sixteen cells or descrete variations of the four digit code to represent a 360 output phase.

As shown, this digital plot illustrates that over the range of code changes or digital cells represented, there is provided a unique combination of two codes for each different space angle of the incoming wave. Thus, for example, where the digital code produced by quantizer 15 (4½) is located in the first cell, which might occur at any one of five different space sectors of the incoming wave, this ambiguity is resolved by referring to the output of the quantizer 14 which may be concurrently generating a code of cells 1, 6, or 11. If the quantizer 14 is producing the code of cell 1 than the incoming wave is defined along the line 4a in FIG. 4 which is a unique plot covering the range of sin θ equals 0 to sin θ equals 2/9 (the space sector from 0° to about 13°). Similarly if the output code of quantizer 14 falls in the second cell while concurrently that of quantizer 15 falls in the eleventh cell, then the incoming wave is uniquely defined along the line 4c of FIG. 4 covering the range of sin θ equals 2/9 to sin θ equals 4/9, or where the space angle is in the sector from about 13° to about 26½°.

In this plot it can be shown that the line 4a uniquely covers the space angles of 0° to about 13°, lines 4b and 4c together cover the space sector of from about 13° to 26½°, and line 4d uniquely covers the space sector from about 26½° to about 42°. In this overall range of from 0° to 42° of the space angle, the wave is uniquely defined by the two output codes of quantizers 14 and 15. However from about 42° to 90°, these codes begin to repeat themselves creating ambiguities as discussed above in connection with FIG. 3. As previously discussed these ambiguities are resolved by employing the additional output phase codes produced by quantizers 16 and 17 that are resolved against each other, and the result thereof is then further compared or resolved against the code derived from quantizers 14 and 15.

A two dimensional digital chart or plot similar to FIG. 4 can be provided for each of the other resolvers 20, 21, 22, and 23 showing the derivation of unique codes for each of the 7½ and 5 wavelengths, and the others.

Figure 5:
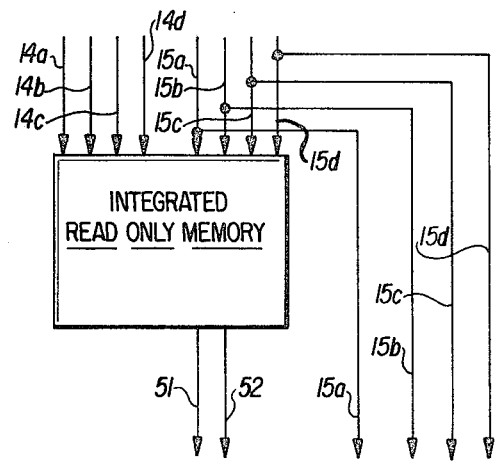
FIG. 5 is a block diagram illustrating one embodiment of resolver 20 or 21 of FIG. 1.

In FIG. 5 is shown a block diagram illustrating one embodiment of resolver 20 in FIG. 1, or resolver 21 in FIG. 1. As will be recalled, the function of resolver 20 is to receive a four digit code from quantizer 15 (3 wavelength spacing) and a four digit code from quantizer 15 (4½ wavelength) and produce a six digit output code that resolves any ambiguities over a range of space angles extending from sin θ of 0 to sin θ of 2/3, or over a space angle sector of from 0° to 43° (on either side of boresight.)

In this preferred embodiment, a conventional on-the-shelf, integrated circuit Read-only-memory 50 is employed, of the type having a total of 256 storage positions or locations. This memory 50 is preprogrammed to produce a preselected two digit code over output lines 51 and 52 when interrogated at each position by the eight digit code input address from quantizers 14 and 15 over input lines 14a to 14d and 15a to 15d. As will be recalled the four digit output code on lines 15a to 15d from quantizer 15 (4½ wavelength) defines the spatial direction or angle θ of the radio wave as being within any one of four and one half spatial sectors (on opposite sides of boresight) as shown in FIG. 3a. Therefore the two digit code preprogrammed within ROM 50, in combination with the four digit code obtained from quantizer 15, provides a resulting six digit code that defines the space angle θ of the radio wave within the space sector referred to above without ambiguity.

A similar read-only-memory is employed to provide resolver 21 that responds to quantizers 16 and 17 in FIG. 1.

Figure 6:
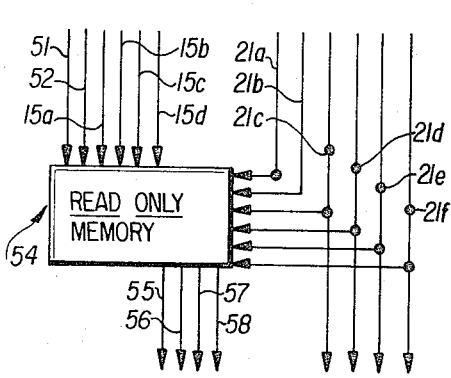
FIG. 6 is a similar block diagram showing one embodiment of resolver 22 of FIG. 1.

As shown by FIG. 6, the next level resolver 22 on the other hand, requires many more storage positions since it responds to a six digit code from resolver 20 as well as a further six digit code from resolver 21. The 12 digit input code, or address, therefore requires a memory capacity of about 4000 positions and produces as an output a four digit code over lines 55, 56, 57, and 58 which is combined with the output code from 21c to 21f obtained from quantizer 17 in FIG. 1 to define the space angle of the wave over its complete sector of 0° to 90° (both sides of boresight).

Figure 8:
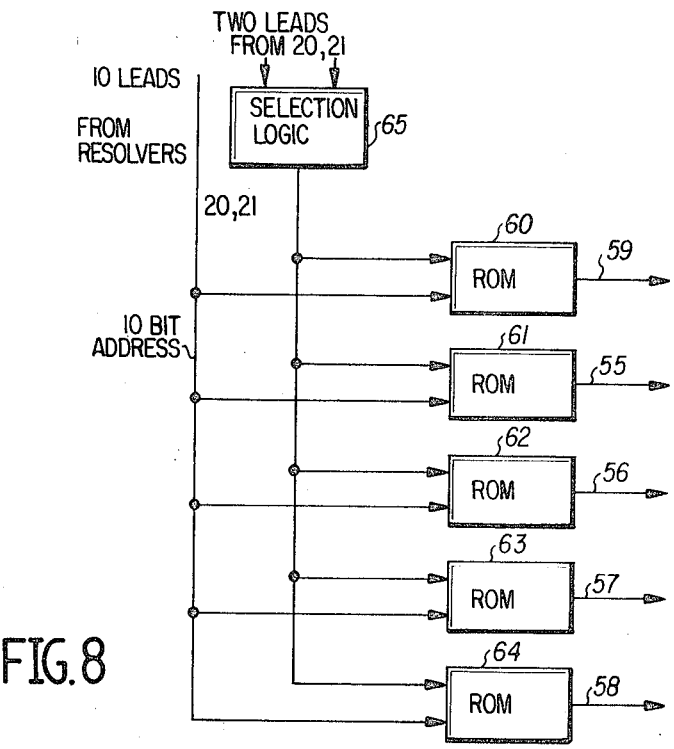
FIG. 8 is a block diagram showing the interconnection of plural small capacity "ROM"
Figure 7:
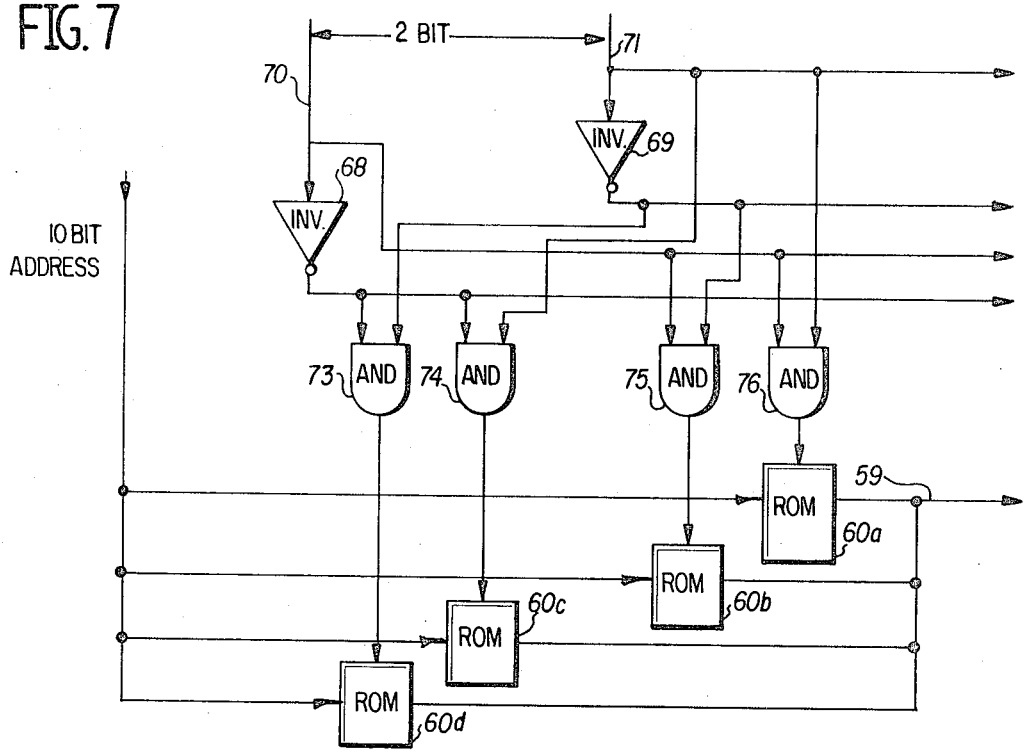
FIG. 7 is a block diagram showing details of the selection logic circuit of FIG. 8.

Since on the shelf, integrated, read-only-memories of this larger capacity are not presently available, a series of smaller capacity memory units are combined as shown in FIGS. 7 and 8 to provide this larger capacity storage device.

As shown in FIG. 8, there is provided a group of five larger capacity composite read only memories, 60, 61, 62, 63 and 64. Each of these memories has a combined storage capacity of at least 4096 bits. Of the twelve bit output code from resolvers 20 and 21, ten of the bits are employed as an address applied to all of the composite memory units 60 to 64, and the remaining two of the bits of the code are applied to a selection logic circuit 64 to select that portion of each of the composite memory units to be so addressed. As noted above, all of these integrated memory units are fixedly preprogrammed to respond to the addressing code and produce an eight bit output code over lines 55 to 59 and 21c to 21f, as shown in FIG. 6. This resulting code fully resolves the space angle direction θ of the incoming radio wave within the accuracy of the quantizer 16 (7½ wavelength antennas — FIG. 3b).

FIG. 7 illustrates the functioning of the selection logic means 65 of FIG. 8 and the manner of combining plural integrated circuit read only memory units to produce each of the composite units such as 60 of FIG. 8.

As shown, the composite unit 60 is comprised of four individual memory units 60a, 60b, 60c, and 60d having their outputs connected in parallel to line 59 and their inputs connected in common to be addressed by a ten bit code. Each of these memory units such as 60a is presently available as a storage unit having a total of 1024 storage positions. Therefore four of such units are required in order to respond to all addresses.

The remaining two bits of the twelve bit code are applied to the selection logic circuitry 65 that functions to select, or to gate, any one of the four memory units 60a to 60d to response to the ten bit address. The selection logic circuitry includes two inverter circuits 68 and 69 and four AND gates 73, 74, 75, and 76. As is observed from FIG. 7, each one of four different combinations of 1 and 0 bits on lines 70 and 71 activates or gates a different one of the memory units 60a to 60d, thereby to select that unit. It is believed now evident, that each of the other composite read-only-memories 61 to 64 of FIG. 8, functions in this same manner as described. It is believed also now evident that the circuitry of FIGS. 7 and FIG. 8 is required only because of the unavailability of a single integrated circuit read-only memory unit having a large enough storage capacity. When such larger capacity integrated units becomes available, they may be employed as a completed unit to eleminate the circuitry of FIGS. 7 and 8.

The circuitry for the final resolver 23 of FIG. 1, is similar to that for resolver 22 in FIG. 6, comprising a device responding to an input code of twelve bits for interrogating the memory (eight bits from the output of resolver 22 and four bits from quantizer 18). The output code being produced is a nine bit code, with five bits being obtained from the interrogated memory unit and the remaining four bits being obtained from quantizer 18.

It will be recalled that the spatial direction of the incoming wave is obtained without ambiguity over the full angular sector of 0° to plus or minus 90° from boresight, from the output code of resolver 22. The purpose of adding additional resolver 23 and quantizer 18 is to obtain greater resolution of the spatial direction of the incoming wave.

Figure 9:
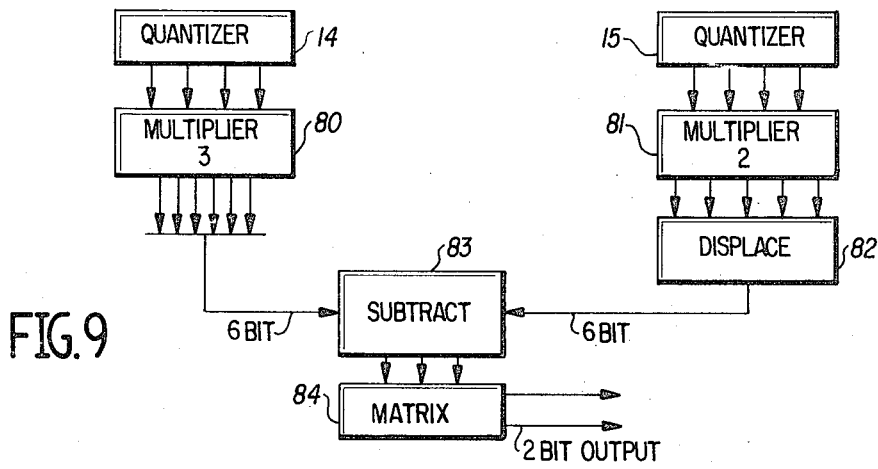
FIG. 9 is a block diagram showing an alternate computer for resolving the digital codes.

An alternative manner of resolving the digital codes against each other is by a computational technique as illustrated in FIG. 9. As is shown in FIG. 4, when the output of quantizer 14 (3 wavelength) is plotted against the output of quantizer 15 (4½ wavelength) there is produced a series of displaced straight lines 4a, 4b, 4c, and 4d, all of which have the same slope and differ only by the position at which they intercept the horizontal axis of the graph. For the plot of a 4½ wavelength spacing of antennas against 3 wavelengths, the ratio or slope is 3/2, or 3 to 2. Therefore one can calculate the "intercept" for each of these displaced lines 4a to 4d, and therefore determine by computation the space sector of the incoming wave.

Mathematically this can be expressed as:

$Q_{4\ 1/2}$ = slope X ($Q_3$ - "intercept")

where $Q_{4\ 1/2}$ is the phase output of quantizer 15;
$Q_3$ is the phase output of quantizer 14; and
the slope is 3/2 for quantizers 14 and 15.

Transposing this equation, one can find the "intercept" for each line as:

"intercept" = $Q_3 - 2/3 \cdot Q_{4\ 1/2}$

3 · "intercept" = $3 Q_3 - 2 Q_{4\ 1/2}$

FIG. 9 illustrates a special purpose digital calculator circuitry for performing this calculation. As shown, the four digit or four bit output from quantizer 14 (3 wavelengths) is applied to a multiplier 80 to produce a six bit output code corresponding to its multiplication by a factor of three. The four bit code of quantizer 15 (4½ wavelengths) is multiplied by a factor of two in multiplier 81 to produce a five bit output code. To this five bit code is added a fixed number displacement unit to derive a six bit code output as shown. This displacement is for convenience in processing.

The resulting six bit numbers are then subtracted from one another in a subtraction circuit 83, thereby yielding a seven bit output. This seven bit output is a unique number representing the "intercept" and therefore defining that one of the four lines 4a, 4b, 4c, and 4d of FIG. 4 that the incoming radio wave is producing. It will be recalled that where the incoming radio wave produces phase coordinates from quantizers 14 and 15 falling along line 4a of FIG. 4, then the space sector of the incoming wave is in the sector of 0° in space to 13° in space. Similarly, a wave producing coordinates along line 4c falls in the range of 13° in space to 26½°, and so forth. Thus the digital code generated by the calculator of FIG. 9 uniquely defines the angular space sector of the incoming wave and this number is processed through a matrix 84 to generate a resulting two bit code defining this angular sector in the same manner as does the two bit output code on lines 51 and 52 of FIG. 5 produced by the read-only-memory embodiment. This two bit code produced by computation is combined with the four bit code from quantizer 15, as previously discussed, to define the direction of the incoming wave.

In a similar manner as described in FIG. 9, each of the other resolvers 22, and 23 may be performed by calculation, rather than by the use of read-only-memories to produce the unique coding required to distinguish between ambiguities and to define the space direction of the incoming wave.

It will be apparent to those skilled in this art that general purpose computer may also be used for calculating the resolved terms, rather than the special purpose fixed programmed units of FIG. 9.

Many other changes and variations may be made without departing from the spirit and scope of this invention and accordingly this invention should be considered as being limited only by the following claims.

I claim:
1. A digital direction finding system comprising:
   an array including a first pair of antennas spaced apart at a distance that is a greater multiple than ½ of the wavelength of the signal to be detected,
   said array including antenna means providing a second pair of antennas having a spacing greater than the first pair,
   first and second phase comparator means for determining the time phase displacement of signals from each pair and providing first and second signals proportional to such phase displacements,
   and a resolver energized by said first and second signals for producing a unique digital code defining the direction of an incoming wave with fewer ambiguities than the signal from either phase comparator.
2. In the system of claim 1, additional antenna elements in said array providing at least one additional pair of elements having a different spacing than either of said two pairs,
   an additional phase comparator for determining the phase displacement of the signals from additional pair,
   and an additional resolver energized by signals from said resolver and said additional phase comparator for further resolving ambiguities in said code.
3. In the system of claim 1, at least four antenna elements providing five pairs of antennas having different spacing, with the most closely spaced pair being spaced apart at a multiple of the wavelength,
   a phase comparator for each such pair providing a signal proportional to the phase displacement for each pair,
   a first and second resolver each energized by a different pair of said phase comparators and providing first and second resolved digital code outputs,
   a third resolver energized by said first and second resolved code output to product a next order resolved code output signal,
   and a fourth resolver energized by a signal obtained from the furthest apart pair of antenna elements and additionally energized by the output signal obtained from the third resolver to further eliminate ambiguities in the digital code.
4. In the direction finding system of claim 1, quantizer means responsive to each comparator for producing quantized signals proportional to the phase displacements, and said resolver energized by said quantized signals.
5. In the direction finding system of claim 1, said resolver including a preprogrammed read-only-memory.
6. In the direction finding system of claim 1, said resolver including means for computing the unique intercept of a linear plot relating the first and second signals.
7. In the system of claim 1, said first pair of antennas spaced apart by three wavelengths, said second pair spaced apart by 4½ wavelengths, and three additional pairs of antennas spaced apart by 7½ wavelengths, five wavelengths, and 12½ wavelengths.
8. In the system of claim 1, quantizing means responsive to each pair of antennas for producing a digital code representing the phase displacement, and said resolver energized by said digital codes for deriving a modified code having fewer ambiguities.
9. In the system of claim 3, each said phase comparator including quantizing means for providing a digitized signal proportional to the phase displacement from each pair, and said resolvers each energized by said quantized signals and producing a quantized code output.
10. In the system of claim 1, the relative spacing of said first and second pairs of antennas producing ambiguities in phase that occur at different space angle directions of the incoming wave.
11. A digital direction finding system comprising a plurality of pairs of differently spaced apart antennas,
   the minimum spacing of anyone of said pairs being greater than one half wavelength at the frequency of an incoming wave,
   the spacing of all others of said pairs being different from eachother,
   quantizing phase comparator means producing plural digital codes each representing the phase displacement between each different pair of antennas,
   plural resolver means for successively comparing different ones of said digital codes to derive modified codes having fewer ambiguities than the compared codes,
   the relative spacing of said different pairs of antennas providing ambiguities at different space angles of the incoming wave.

* * * * *